(12) United States Patent
Myodo et al.

(10) Patent No.: US 11,850,625 B2
(45) Date of Patent: Dec. 26, 2023

(54) SYRINGE FILLED WITH RESIN COMPOSITION AND STORAGE METHOD THEREFOR

(71) Applicant: NAMICS CORPORATION, Niigata (JP)

(72) Inventors: Hiroki Myodo, Niigata (JP); Yosuke Sakai, Niigata (JP); Masaaki Hoshiyama, Niigata (JP)

(73) Assignee: NAMICS CORPORATION, Niigata (JP)

( * ) Notice: Subject to any disclaimer, the term of this patent is extended or adjusted under 35 U.S.C. 154(b) by 339 days.

(21) Appl. No.: 17/414,754

(22) PCT Filed: Jan. 29, 2020

(86) PCT No.: PCT/JP2020/003084
§ 371 (c)(1),
(2) Date: Jun. 16, 2021

(87) PCT Pub. No.: WO2020/162274
PCT Pub. Date: Aug. 13, 2020

(65) Prior Publication Data
US 2022/0072582 A1   Mar. 10, 2022

(30) Foreign Application Priority Data

Feb. 8, 2019 (JP) .................................. 2019-021653

(51) Int. Cl.
*B05C 17/005* (2006.01)
*C08G 59/24* (2006.01)
(Continued)

(52) U.S. Cl.
CPC .... *B05C 17/00593* (2013.01); *C08F 222/102* (2020.02); *C08G 59/245* (2013.01); *C08G 59/5033* (2013.01)

(58) Field of Classification Search
CPC . B05C 17/00593; B05C 5/02; C08F 222/102; C08G 59/245; C08G 59/5033;
(Continued)

(56) References Cited

U.S. PATENT DOCUMENTS 2,591,046 A * 4/1952 Brown ................. A61M 5/284
604/193
4,846,796 A * 7/1989 Carrell ............... A61M 5/3243
604/110

(Continued)

FOREIGN PATENT DOCUMENTS

CN          1622873 A    6/2005
JP       2007-533450 A   11/2007
(Continued)

OTHER PUBLICATIONS

Jusong, "Concrete Science", Harbin Institute of Technology Press, 2011, first edition, pp. 130, total 5 pages; Cited in Chinese Office Action (CNOA) dated Jul. 19, 2022 for Chinese Patent Application No. 202080008541.2; English translation.

(Continued)

*Primary Examiner* — Donnell A Long
(74) *Attorney, Agent, or Firm* — Rankin, Hill & Clark LLP (57) ABSTRACT

There are provided a syringe filled with a resin composition and a storage method thereof. According to the syringe and the storage method, mixed air, which causes the resin composition to be intermittently discharged from the syringe, is suppressed. The syringe filled with the resin composition includes a syringe, a resin composition filling the syringe, and a plunger. The resin composition contains voids. The ratio of the volume of the voids relative to the (Continued)

volume of the resin composition is 1.0 ppm by volume to 520 ppm by volume. The voids have a maximum diameter of 2,500 μm or less.

8 Claims, 3 Drawing Sheets

(51) Int. Cl.
 *C08G 59/50* (2006.01)
 *C08F 222/10* (2006.01)
(58) Field of Classification Search
 CPC ........ C08L 33/064; C08L 33/00; C08L 63/00; B05D 1/26; B05D 3/00; C08K 3/36; C08K 5/14; C08K 9/06
 See application file for complete search history.

(56) References Cited

U.S. PATENT DOCUMENTS

| | | | | |
|---|---|---|---|---|
| 5,016,784 | A * | 5/1991 | Batson | B05C 17/00516 222/386 |
| 5,242,405 | A * | 9/1993 | Howe | A61M 5/3129 604/218 |
| 5,779,668 | A * | 7/1998 | Grabenkort | A61M 5/3129 604/218 |
| 5,788,670 | A * | 8/1998 | Reinhard | A61M 5/284 604/191 |
| 5,971,953 | A * | 10/1999 | Bachynsky | A61M 5/31596 604/181 |
| 6,386,396 | B1 * | 5/2002 | Strecker | G01F 13/005 222/413 |
| 11,666,706 | B2 * | 6/2023 | Takeuchi | A61M 5/178 604/187 |
| 2004/0108334 | A1 * | 6/2004 | Strecker | B01F 35/7174 222/145.1 |
| 2005/0127579 | A1 | 6/2005 | Suzuki | |
| 2005/0236063 | A1 | 10/2005 | Digregorio et al. | |
| 2011/0082430 | A1 * | 4/2011 | Conzone | A61M 5/31513 604/230 |
| 2012/0205001 | A1 | 8/2012 | Mizoguchi et al. | |
| 2013/0338606 | A1 * | 12/2013 | Conzone | A61M 5/31513 604/230 |
| 2017/0253351 | A1 | 9/2017 | Podnar | |
| 2020/0001011 | A1 | 1/2020 | Myodo et al. | |

FOREIGN PATENT DOCUMENTS

| | | |
|---|---|---|
| JP | 2011-031176 A | 2/2011 |
| JP | 2012-45444 A | 3/2012 |
| WO | 2018-168587 A1 | 9/2018 |

OTHER PUBLICATIONS

Yunlong et al., "Manufacturing and Application of Silicon Carbide and Its Composites", National Defense Industry Press, 2015, pp. 87, total 5 pages; Cited in CNOA; English translation.

International Search Report (ISR) dated Apr. 14, 2020 filed in PCT/JP2020/003084.

* cited by examiner

SYRINGE FILLED WITH RESIN COMPOSITION AND STORAGE METHOD THEREFOR

TECHNICAL FIELD

An aspect of the present disclosure relates to a syringe filled with a resin composition and a storage method thereof.

BACKGROUND ART

Viscous materials such as sealants for mechanical components or electronic components, adhesives, pastes for forming electrical and electronic circuits, and solders for mounting electronic components are supplied to microscopic specific sites of objects. Therefore, these viscous materials are sometimes supplied using a syringe. When a large amount of air is mixed in a viscous material supplied from a syringe, the viscous material is intermittently discharged from the syringe. This sometimes causes discharge break in which a portion supplied with no viscous material occurs on an object. In that case, connection failure or the like is caused.

For example, PATENT LITERATURE 1 discloses the technology to prevent gas from being mixed in a viscous material when a syringe is filled with a viscous material such as a resin composition.

CITATION LIST

Patent Literature

PATENT LITERATURE 1: JP-A-2012-45444

SUMMARY OF THE INVENTION

Problems to be Solved by the Invention

A syringe is sometimes previously filled with a viscous material such as a resin composition. That is, a syringe filled with a resin composition is sometimes stored or transported. The volume of the resin composition filling the syringe sometimes changes due to temperature change during storage or during transportation. In this case, air is sometimes mixed in the resin composition filling the syringe. This causes intermittent discharge or discharge break.

Therefore, an object of the present disclosure is to provide a syringe filled with a resin composition in which mixed air, which causes intermittent discharge of a resin composition from a syringe, can be suppressed, and a storage method thereof.

Solutions to the Problems

Solutions for solving the problems are as follows. The present disclosure encompasses the following aspects.

A syringe filled with a resin composition according to a first aspect of the present disclosure includes: a syringe; a resin composition filling the syringe; and a plunger, in which the resin composition contains voids, a ratio of a volume of the voids relative to a volume of the resin composition is 1.0 ppm by volume to 520 ppm by volume, and the voids have a maximum diameter of 2,500 μm or less.

A storage method of a syringe filled with a resin composition according to a second aspect of the present disclosure includes storing the syringe filled with the resin composition at −80° C. to 0° C.

Effects of the Invention

According to the above-described aspects of the present disclosure, there can be provided a syringe filled with a resin composition, in which mixed air, which causes intermittent discharge of a resin composition from a syringe, can be suppressed, and a storage method thereof.

DESCRIPTION OF EMBODIMENTS

Hereinafter, a syringe filled with a resin composition and a storage method thereof according to an aspect of the present disclosure will be described based on embodiments. However, the below-described embodiments are examples for specifically describing the technological idea of the present disclosure. The technological idea of the present disclosure is not limited to the syringe filled with a resin composition and the storage method described below.

A syringe filled with a resin composition according to a first embodiment of the present disclosure includes a syringe, a resin composition filling the syringe, and a plunger. The resin composition contains voids. The volume ratio of the voids relative to the volume of the resin composition is 1.0 ppm by volume to 520 ppm by volume. The voids have a maximum diameter of 2,500 μM or less. As described herein, the voids mean spatial parts in the resin composition.

The volume of the voids contained in the resin composition filling the syringe can be measured using an X-ray industrial computer tomograph (hereinafter, also referred to as an "industrial X-ray CT device") (for example, RF Co., Ltd., trade name: NAOMi-CT). In this measurement, the inside of the syringe is scanned, for example, with an imaging resolution of 0.068 mm using an industrial X-ray CT device. Accordingly, a scanned image is obtained. From the obtained scanned image, the diameters of the voids filling the syringe are measured through visual inspection. From each of the measured diameters, the volume of each void can be calculated. The volume ratio of the voids contained in the resin composition filling the syringe can be calculated in the following manner. The volumes of the voids measured using an industrial X-ray CT device are summed. This summed value is divided by the volume of the resin composition filling the syringe. Specifically, the volume ratio of the voids relative to the volume of the resin composition filling the syringe can be calculated based on the following formula (I).

[Mathematical Formula 1]

$$\text{Volume ratio of voids (ppm by volume)} = \text{total value of volumes of voids contained in resin composition/volume of resin composition filling syringe} \times 10^6 \quad (I)$$

The voids contained in the resin composition filling the syringe can be observed, for example, on the above-described image obtained by a scan through an industrial X-ray CT device. The maximum diameter of these voids means the largest linear distance among linear distances of the maximum lengths of the observed voids. For all the voids in the syringe on the scanned image, the linear distance of the maximum length was measured. The longest linear distance among the measured linear distances is defined as the maximum diameter. Also, for all the voids in the syringe on the scanned image, the linear distance of the maximum length was measured. The summed value of the linear distances of the largest lengths of the voids is divided by the number of voids. The obtained value is defined as the average diameter of the voids.

The resin composition filling the syringe is sometimes frozen at a temperature of 0° C. or lower during storage or transportation for a purpose of maintaining the stability of the resin composition. In the frozen resin composition, a reaction during storage or during transportation is suppressed. This enables the resin composition to be maintained in a stable state. However, the volume of the resin composition filling the syringe shrinks due to temperature change caused by freezing. This sometimes forms a space between the inner wall of the syringe and the resin composition reduced in volume due to freezing. When the resin composition in the syringe is thawed when used, the volume of the resin composition enlarges due to thawing. Air present in a space between the resin composition reduced in volume when frozen and the inner wall of the syringe is mixed in the thawed resin composition. When air is mixed in the resin composition during thawing, this air sometimes causes intermittent discharge or discharge break when the resin composition is discharged from the syringe.

Figure 1:
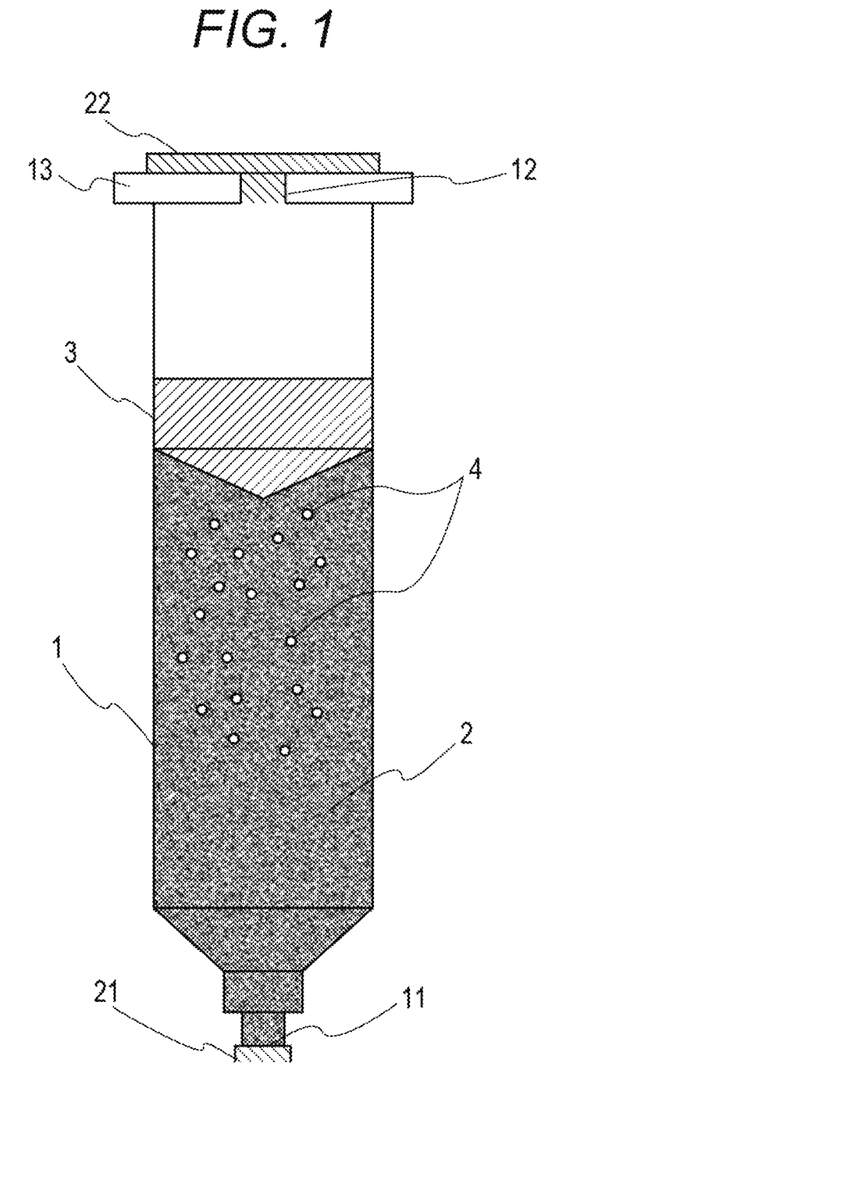
FIG. 1 is a cross-sectional view illustrating a schematic configuration of a syringe filled with a resin composition according to a first embodiment of the present disclosure.

FIG. 1 is a cross-sectional view illustrating a schematic configuration of a syringe filled with a resin composition according to a first embodiment of the present disclosure. In FIG. 1, a syringe filled with a resin composition includes a syringe 1, a resin composition 2 filling the syringe 1, and a plunger 3 inserted in the syringe 1. The resin composition 2 filling the syringe 1 contains a plurality of voids 4. The syringe 1 has a diameter-reduced opening 11 on its one end. Furthermore, the syringe 1 has an opening 12 on the other end opposite the opening 11. Into the opening 12, a plunger rod is inserted. Around the opening 12, a flange 13 may be disposed. Also, to the diameter-reduced opening 11, a tip cap 21 to block the opening 11 may be disposed. To the opening 12 into which a plunger rod is inserted, a head cap 22 to block the opening 12 may be disposed.

The volume ratio of the voids relative to the volume of the resin composition 2 filling the syringe is 1.0 ppm by volume to 520 ppm by volume. The resin composition 2 contains the small voids 4 having a maximum diameter of 2,500 μm or less. In this manner, the resin composition 2 filling the syringe contains the small voids 4. This can reduce a difference between the volume change of the resin composition and the volume change of the syringe due to temperature change during storage and during transportation. Accordingly, air having a size to cause an occurrence of intermittent discharge or discharge break can be prevented from being mixed in the resin composition. For example, when the syringe filled with the resin composition is frozen at a temperature of 0° C. or lower, the volume shrinkage of the resin composition is larger than the volume shrinkage of the syringe itself. In this case, the difference between the volume shrinkage of the resin composition and the volume shrinkage of the syringe facilitates peeling of the frozen resin composition from the inner wall of the syringe. As a result, a space is formed between the resin composition and the inner wall of the syringe. The resin composition 2 filling the syringe has a volume ratio of 1.0 ppm by volume to 520 ppm by volume and can previously contain the small voids 4 having a maximum diameter of 2,500 μm or less. This can suppress the volume shrinkage of the resin composition when frozen and accordingly the formation of a space between the inner wall of the syringe 1 and the resin composition. The resin composition 2 filling the syringe 1 previously contains the small voids 4. This suppresses the volume shrinkage of the resin composition 2 when frozen and further suppresses peeling between the resin composition 2 and the inner wall of the syringe. Accordingly, air mixed in the resin composition when thawed, which causes intermittent discharge or discharge break, can be suppressed.

The volume ratio of the voids contained in the resin composition filling the syringe, relative to the volume of the resin composition filling the syringe, is more preferably 1.0 ppm by volume to 510 ppm by volume, and further preferably 1.0 ppm by volume to 505 ppm by volume. When the volume ratio of the voids contained in the resin composition is less than 1.0 ppm by volume relative to the volume of the resin composition filling the syringe, the volume ratio of the voids previously contained in the resin composition is excessively small. Therefore, the volume shrinkage of the resin composition when frozen is unlikely to be suppressed. Accordingly, peeling of the shrunk resin composition from the inner wall of the syringe is unlikely to be suppressed. When the volume ratio of the voids contained in the resin composition exceeds 520 ppm by volume relative to the volume of the resin composition filling the syringe, the size of the mixed voids sometimes comes to be large. Therefore, discharge break failures sometimes occur when the resin composition is discharged from the syringe.

When the maximum diameter of the voids contained in the resin composition filling the syringe is 2,500 μm or less, volume change of the resin composition due to temperature change can be suppressed. This can reduce a difference between the volume change of the resin composition and the volume change of the syringe due to temperature change. Therefore, mixed air, which forms large voids and accordingly causes an occurrence of intermittent discharge or discharge break, can be suppressed. The maximum diameter of the voids contained in the resin composition filling the syringe is more preferably 2,400 μm or less, further preferably 2,300 μm or less, and more further preferably 2,200 μm or less. The lower limit value of the maximum diameter of the voids contained in the resin composition filling the syringe is not particularly limited. The maximum diameter of the voids contained in the resin composition filling the syringe is generally 100 μm or more.

When the voids contained in the resin composition filling the syringe have a volume ratio of 1.0 ppm by volume to 520 ppm by volume and a maximum diameter of 2,500 μm or less, the average diameter of the voids may be 200 μm to 400 μm or 250 μm to 350 μm. When the voids contained in the resin composition filling the syringe have an average diameter of 200 μm to 400 μm, volume change of the resin composition due to temperature change can be suppressed. This can reduce a difference between the volume change of the resin composition and the volume change of the syringe due to temperature change. Therefore, mixed air, which forms large voids and accordingly causes an occurrence of intermittent discharge or discharge break, can be suppressed.

A method for previously containing small voids having a maximum diameter of 2,500 μm or less in the resin composition filling the syringe will be described. For example, the resin composition can contain voids by kneading the resin composition in batches of 300 g for 20 minutes using a triple roll mill. Thereafter, large voids are removed from the resin composition by a hard mixer. Furthermore, the resin composition is centrifuged at a rotation of 100 rpm and a revolution of 1000 rpm for a predetermined time, using a centrifuge (for example, manufactured by Nippon Sosey Kogyo Corporation, trade name UFO-15). Accordingly, large voids, which cause an occurrence of intermittent discharge or discharge break, can be removed from the resin composition. As a result, the volume ratio of the voids relative to the volume of the resin composition filling the syringe becomes 1.0 ppm by volume to 520 ppm by volume. Therefore, small voids having a maximum diameter of 2,500 μM or less can be contained in the resin composition. In another method for previously containing small voids in the resin composition filling the syringe, for example, the resin composition is stirred at 50 to 150 Pa and 40 rpm for an optional time, using a hard mixer (for example, manufactured by Nippon Sosey Kogyo Corporation, trade name UV10L). Accordingly, large voids, which cause an occurrence of intermittent discharge or discharge break, are removed from the resin composition. As a result, the volume ratio of the voids relative to the volume of the resin composition filling the syringe becomes 1.0 ppm by volume to 520 ppm by volume. Therefore, small voids having a maximum diameter of 2,500 μm or less can be contained in the resin composition.

The resin composition filling the syringe preferably includes at least one resin selected from epoxy resin and acrylic resin. The at least one resin selected from epoxy resin and acrylic resin is used as a material such as a sealant for mechanical components or electronic components, an adhesive, or a paste for forming electrical and electronic circuits.

The epoxy resin is preferably liquid at normal temperature. However, the epoxy resin may be solid at normal temperature. The epoxy resin being solid at normal temperature can be used in liquid form by being diluted with liquid epoxy resin, a liquid solvent, or a liquid diluent. The epoxy resin means an epoxy resin having in the molecule at least one epoxy or glycidyl group. Examples of the epoxy resin include bisphenol A type epoxy resin, bisphenol F type epoxy resin and derivatives thereof (for example, alkylene oxide adducts), hydrogenated bisphenol A type epoxy resin, hydrogenated bisphenol F type epoxy resin, brominated bisphenol A type epoxy resin, biphenyl type epoxy resin, naphthalene type epoxy resin, glycidyl ether type epoxy resin such as alkyl glycidyl ether, alkyl phenyl glycidyl ether, alkenyl glycidyl ether, alkynyl glycidyl ether, or phenyl glycidyl ether, each having 6 to 36 carbon atoms, glycidyl ester type epoxy resin such as alkyl glycidyl ester, alkenyl glycidyl ester, or phenyl glycidyl ester, each having 6 to 36 carbon atoms, and silicone epoxy resin. One of these epoxy resins may be singly used. Alternatively, two or more epoxy resins may be used in combination.

The acrylic resin is preferably (meth)acrylic resin. The acrylic resin means a compound having in the molecule a (meth)acryloyl group. Examples of the (meth)acrylic resin include methyl (meth)acrylate, ethyl (meth)acrylate, n-butyl (meth)acrylate, isobutyl (meth)acrylate, tert-butyl (meth) acrylate, isodecyl (meth)acrylate, lauryl (meth)acrylate, tridecyl (meth)acrylate, cetyl (meth)acrylate, stearyl (meth) acrylate, isoamyl (meth)acrylate, isostearyl (meth)acrylate, behenyl (meth)acrylate, 2-ethylhexyl (meth)acrylate, other alkyl (meth)acrylates, cyclohexyl (meth)acrylate, tert-butyl cyclohexyl (meth)acrylate, tetrahydrofurfuryl (meth)acrylate, benzyl (meth)acrylate, phenoxyethyl (meth)acrylate, isobornyl (meth)acrylate, glycidyl (meth)acrylate, trimethylol propane tri(meth)acrylate, zinc mono(meth)acrylate, zinc di(meth)acrylate, dimethylaminoethyl (meth)acrylate, diethyl aminoethyl (meth)acrylate, neopentyl glycol (meth) acrylate, trifluoroethyl (meth)acrylate, 2,2,3,3-tetrafluoropropyl (meth)acrylate, 2,2,3,3,4,4-hexafluorobutyl (meth) acrylate, perfluorooctyl (meth)acrylate, perfluorooctylethyl (meth)acrylate, ethylene glycol di(meth)acrylate, propylene glycol di(meth)acrylate, 1,4-butanediol di(meth)acrylate, 1,6-hexanediol di(meth)acrylate, 1,9-nonanediol di(meth) acrylate, 1,3-butanediol di(meth)acrylate, 1,10-decanediol di(meth)acrylate, tetramethylene glycol di(meth)acrylate, methoxyethyl (meth)acrylate, butoxyethyl (meth)acrylate, ethoxydiethylene glycol (meth)acrylate, methoxypolyalkylene glycol mono(meth)acrylate, octoxypolyalkylene glycol mono(meth)acrylate, lauroxypolyalkylene glycol mono (meth)acrylate, stearoxypolyalkylene glycol mono(meth) acrylate, allyloxypolyalkylene glycol mono(meth)acrylate, nonylphenoxypolyalkylene glycol mono(meth)acrylate, di(meth)acryloyloxymethyl tricyclodecane, N-(meth)acryloyloxyethyl maleimide, N-(meth)acryloyloxyethyl hexahydrophthalimide, and N-(meth)acryloyloxyethyl phthalimide. A further example of the (meth)acrylic resin is (meth) acrylamide. Examples of the (meth)acryl amide include N,N'-methylenebis(meth)acrylamide, N,N'-ethylenebis (meth)acrylamide, and 1,2-di(meth)acrylamide ethylene glycol. One of these acrylic resins may be singly used. Alternatively, two or more acrylic resins may be used in combination.

An example of the acrylic resin is poly(meth)acrylate. Examples of the poly(meth)acrylate includes a copolymer of (meth)acrylic acid and (meth)acrylate or a copolymer of (meth)acrylate having a hydroxyl group and (meth)acrylate having no polar group. An example of the acrylic resin is a (meth)acrylate having a hydroxyl group. Examples of the (meth)acrylate having a hydroxyl group include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 1,2-cyclohexanediol mono(meth)acrylate, 1,3-cyclohexanediol mono(meth)acrylate, 1,4-cyclohexanediol mono (meth)acrylate, 1,2-cyclohexanedimethanol mono(meth) acrylate, 1,3-cyclohexanedimethanol mono(meth)acrylate, 1,4-cyclohexanedimethanol mono(meth)acrylate, 1,2-cyclohexanediethanol mono(meth)acrylate, 1,3-cyclohexanediethanol mono(meth)acrylate, 1,4-cyclohexanediethanol mono(meth)acrylate, glycerin mono(meth)acrylate, glycerin di(meth)acrylate, trimethylolpropane mono(meth)acrylate, trimethylolpropane di(meth)acrylate, pentaerythritol mono (meth)acrylate, pentaerythritol di(meth)acrylate, pentaerythritol tri(meth)acrylate, and neopentyl glycol mono(meth) acrylate. Another example of the acrylic resin is a (meth) acrylate having a carboxy group obtained through a reaction between the above-described (meth)acrylate having a hydroxyl group and dicarboxylic acid or a derivative thereof. Examples of the dicarboxylic acid usable herein include oxalic acid, malonic acid, succinic acid, glutaric acid, adipic acid, pimelic acid, suberic acid, azelaic acid, sebacic acid, maleic acid, fumaric acid, phthalic acid, tetrahydrophthalic acid, hexahydrophthalic acid, and derivatives thereof. One of these acrylic resins may be singly used. Alternatively, two or more dicarboxylic acids may be used in combination.

The resin composition filling the syringe may include, other than at least one resin selected from epoxy resin and acrylic resin, at least one ingredient selected from the group consisting of a filler, a curing agent, a solvent, a reactive diluent, an elastomer, a coupling agent, a flux agent, a defoamer, a surface controlling agent, a rheology controlling agent, a colorant, a plasticizer, and a dispersant.

The result of the measurement of a viscosity of less than 200 Pa·s of the resin composition filling the syringe at 25° C. and a rotational speed of 50 rpm using a rotary viscometer is preferably 2.5 Pa·s to 650 Pa·s. Furthermore, the result of the measurement of a viscosity of 200 Pa·s or more of the resin composition filling the syringe at 25° C. and a rotational speed of 10 rpm using a rotary viscometer is preferably 2.5 Pa·s to 650 Pa·s. When the viscosity of the resin composition filling the syringe is 2.5 Pa·s to 650 Pa·s, the ratio of the volume of the voids relative to the volume of the resin composition becomes 1.0 ppm by volume to 520 ppm by the above-described method. Then, the resin composition can fill the syringe in such a manner that the voids have a maximum diameter of 2,500 μm or less.

More specifically, when the viscosity at 25° C. of the resin composition filling the syringe is in the range of not less than 2.5 Pa·s and less than 20 Pa·s, this viscosity can be measured, for example, at 50 rpm using a rotary viscometer RV type (spindle SC-14) (manufactured by Brookfield Co.). Also, when the viscosity at 25° C. of the resin composition filling the syringe is in the range of not less than 20 Pa·s and less than 200 Pa·s, this viscosity can be measured, for example, at 50 rpm using a rotary viscometer HBDV-1 (spindle SC4-14) (manufactured by Brookfield Co.). Also, when the viscosity at 25° C. of the resin composition filling the syringe is in the range of 200 Pa·s or more and 1,000 Pa·s or less, this viscosity can be measured, for example, at 10 rpm using a rotary viscometer HBDV-1 (spindle SC4-14) (manufactured by Brookfield Co.).

In the resin composition filling the syringe, thixotropic indices TI1 to TI3 measured under the following conditions (1) to (3) are preferably 0.8 to 3.5.
(1) Thixotropic index TI1 that is a ratio between the viscosity at 5 rpm and the viscosity at 50 rpm, when the viscosity at 50 rpm measured at 25° C. using a rotary viscometer (for example, RV type (spindle SC-14), manufactured by Brookfield Co.) is in the range of not less than 2.5 Pa·s and less than 20 Pa·s.
(2) Thixotropic index TI2 that is a ratio between the viscosity at 5 rpm and the viscosity at 50 rpmn, when the viscosity at 50 rpm measured at 25° C. using a rotary viscometer (for example, rotary viscometer HBDV-1 (spindle SC4-14), manufactured by Brookfield Co.) is in the range of not less than 20 Pa·s and less than 200 Pa·s.
(3) Thixotropic index TI3 that is a ratio between the viscosity at 1 rpm and the viscosity at 10 rpm, when the viscosity at 10 rpm measured at 25° C. using a rotary viscometer (for example, rotary viscometer HBDV-1 (spindle SC4-14), manufactured by Brookfield Co.) is in the range of 200 Pa·s or more and 1,000 Pa·s or less.

Thixotropic index TI1 measured under the above-described condition (1) is a ratio between viscosity $V1_{5\,rpm}$ at 5 rpm and viscosity $V1_{50\,rpm}$ at 50 rpm, measured at 25° C. using a rotary viscometer RV type (spindle SC-14) (manufactured by Brookfield Co.). TI1 is calculated according to the following formula (II).

[Mathematical Formula 2]

$$TI1 = V1_{5\,rpm} / V1_{50\,rpm} \quad (II)$$

Thixotropic index TI2 measured under the above-described condition (2) is a ratio between viscosity $V2_{5\,rpm}$ at 5 rpm and viscosity $V2_{50\,rpm}$ at 50 rpm, measured at 25° C. using a rotary viscometer HBDV-1 (spindle SC-14) (manufactured by Brookfield Co.). TI2 is calculated according to the following formula (III).

[Mathematical Formula 3]

$$TI2 = V2_{5\,rpm} / V2_{50\,rpm} \quad (III)$$

Thixotropic index TI3 measured under the above-described condition (3) is a ratio between viscosity $V3_{1\,rpm}$ at 1 rpm and viscosity $V3_{10\,rpm}$ at 10 rpm, measured at 25° C. using a rotary viscometer HBDV-1 (spindle SC-14) (manufactured by Brookfield Co.). TI3 is calculated according to the following formula (III).

[Mathematical Formula 4]

$$TI3 = V3_{1\,rpm} / V3_{10\,rpm} \quad (IV)$$

Thixotropic indices TI1 to TI3 measured under the measurement conditions corresponding to the viscosity of the resin composition are also termed TI values. The TI value is an index representing thixotropic properties, measured as dependence of viscosity to shear rate (rotational speed of a viscometer). For Newtonian fluid, such as water, of which viscosity does not change even when the shear rate changes, the TI value is 1. When the TI value is less than 1, it means that the viscosity is smaller when the shear force is small than when the shear force is large. When the TI value is more than 1, it means that the viscosity is larger when the shear force is small than when the shear force is large. The larger the TI value, the higher the thixotropic properties.

When the measured value for the viscosity of the resin composition filling the syringe is less than 200 Pa·s at 25° C. and 50 rpm or is as high as 200 Pa·s or more to 1,000 Pa·s at 25° C. and 10 rpm, thixotropic indices TI1 to T13 are preferably in the range of 0.8 to 3.5. When thixotropic indices TI1 to TI3 are in the range of 0.8 to 3.5, the small voids mixed in the resin composition filling the syringe have good dispersibility. Therefore, workability when the resin composition is discharged from the syringe improves. The resin composition filling the syringe may have thixotropic properties close to those of Newtonian fluid as a thixotropic index of 0.8 to 1.2. Alternatively, the resin composition filling the syringe may have thixotropic properties of non-Newtonian fluid as a thixotropic index of more than 1.2.

The syringe may be made from polypropylene, polyethylene, polystyrene, polyester, or the like. Particularly preferably, the syringe is made from polypropylene or polyethylene. Accordingly, a difference between the volume change of the resin composition and the volume change of the syringe due to temperature change can be easily reduced by the voids contained in the resin composition filling the syringe. Also, polypropylene and polyethylene are inexpensive. Therefore, the cost of the syringe can be reduced.

The capacity of the syringe is preferably 1 $cm^3$ to 600 $cm^3$. Here, the capacity of the syringe means the capacity of the inside of the syringe. The capacity of the syringe is more preferably 3 $cm^3$ to 500 $cm^3$, and further preferably 3 $cm^3$ to 360 $cm^3$. When the capacity of the syringe is 1 $cm^3$ to 600 $cm^3$, the volume change of the resin composition due to temperature change can be suppressed by previously containing small voids in the resin composition filling the syringe. This can reduce a difference between the volume change of the resin composition and the volume change of the syringe due to temperature change. Therefore, mixed air, which forms large voids and accordingly causes an occurrence of intermittent discharge or discharge break, can be suppressed. An example of the syringe is a syringe having a capacity of 1 cm³, 2 cm³, 3 cm³, 5 cm³, 10 cm³, 30 cm³, 55 cm³, 180 cm³, 360 cm³, or 600 cm³.

The material constituting the plunger is not particularly limited. Examples of the material constituting the plunger include elastic materials containing various rubber materials, thermoplastic elastomers, and the like. Examples of the various rubber materials include natural rubber, butyl rubber, isoprene rubber, butadiene rubber, styrene-butadiene rubber, and silicone rubber. Examples of the thermoplastic elastomer include polyethylene, polyurethane, polyester, and polyamide. Regarding the form of the plunger, at least one end of the plunger may be conical. Alternatively, at least one end of the plunger may be flat.

A production method of a syringe filled with a resin composition includes, for example, previously containing small voids having a maximum diameter of 2,500 µm or less in a resin composition by the above-described method, filling a syringe with this resin composition at a pressure of more than 0.1 MPa and not more than 0.6 MPa by a pressurized filling method, and inserting a plunger into the syringe so as to adhere to the filling resin composition. Regarding the syringe filled with resin composition, a tip cap 21 may be fitted to a diameter-reduced opening 11 of the syringe, as illustrated in FIG. 1. Furthermore, a head cap 22 may be fitted to an opening 12 having a flange.

The syringe filled with the resin composition is stored at a temperature of preferably −80° C. to 0° C. Regarding a storage method of the syringe filled with the resin composition, the syringe filled with the resin composition can be refrigerated at −80° C. to 0° C. thereby to suppress a reaction of the resin composition filling the syringe. This enables the resin composition to be stored in a stable state. The syringe filled with the resin composition is stored at preferably −80° C. to −10° C., and further preferably −80° C. to −20° C. In the syringe filled with the resin composition, volume change of the resin composition can be suppressed by small voids contained in the resin composition, even when volume change has increased by storage at low temperature. This can reduce a difference between the volume change of the resin composition and the volume change of the syringe. Therefore, mixed air, having a size to cause an occurrence of intermittent discharge or discharge break when the resin composition is discharged from the syringe, can be suppressed.

EXAMPLES

Hereinafter, embodiments of the present disclosure will be more specifically described by examples. However, the technology of the present disclosure is not limited to these examples.

Resin compositions EPO1 to EPO6 and ACR1 used in Examples and Comparative Examples were produced so as to have formulation ratios indicated in Table 1. The resin compositions were prepared by kneading the following raw materials using a triple roll mill. It is noted that numerical values for the compositions in Tables are in parts by mass.

A: bisphenol F type epoxy resin, product name YDF8170, manufactured by Nippon Steel Chemical Co., Ltd., epoxy equivalent 158 g/eq.

B: amine curing agent: 4,4'-diamino-3,3'-diethyl diphenylmethane, product name Kayahard A-A (HDAA), manufactured by Nippon Kayaku Co., Ltd.

C: tricyclodecane dimethanol diacrylate, product name A-DCP, Shin-Nakamura Kogyo Co., Ltd.

D: polymerization initiator, t-butyl-α-cumylperoxide, product name Perbutyl C, manufactured by Nof Corporation.

E-1: inorganic filler, highly pure synthetic spherical silica (silane coupling agent (3-glycidoxypropyltrimethoxysilane) surface treatment silica filler) (average particle size 0.6 µm), product name SE2200-SEE, manufactured by Admatechs Company Limited.

E-2: inorganic filler, hydrophobic fumed silica (average particle size 20 nm), product name R805, manufactured by Nippon Aerosil Co., Ltd.

TABLE 1

|   |   | Epo1 | Epo2 | Epo3 | Epo4 | Epo5 | Epo6 | ACR1 |
|---|---|---|---|---|---|---|---|---|
| A | Bisphenol type epoxy resin | 100.00 | 100.00 | 100.00 | 100.00 | 100.00 | 100.00 | — |
| B | 4,4'-diamino-3,3'-diethyl diphenylmethane | 40.85 | 40.85 | 40.85 | 40.85 | 40.85 | 40.85 | — |
| C | Tricyclodecane dimethanol diacrylate | — | — | — | — | — | — | 100.00 |
| D | t-butyl-α-cumylperoxide | — | — | — | — | — | — | 0.20 |
| E-1 | Highly pure synthetic spherical silica (average particle size 0.6 µm) | 101.99 | 140.85 | 194.50 | 299.30 | 1253.52 | 1584.51 | 158.00 |
| E-2 | Hydrophobic fumed silica (average particle size 20 nm) | — | — | — | — | 14.08 | 35.21 | 5.30 |
|   | Viscosity (Pa·s) | 5 | 10 | 15 | 60 | 400 | 623 | 15 |
|   | TI value | 1 | 0.9 | 1 | 0.9 | 1.5 | 3.1 | 3 |

For each of the produced resin compositions, the viscosity (Pa·s) and the thixotropic index were measured under the following conditions. The measurement results are indicated in Table 1. It is noted that in Table 1 and Tables 4 to 6, TI1 to TI3 measured under the conditions corresponding to the viscosity of the resin composition are described as TI values.

(1) When the viscosity at 25° C. is in the range of not less than 2.5 Pa·s and less than 20 Pa·s, the viscosity was measured at 50 rpm using a rotary viscometer RV type (spindle SC-14) (manufactured by Brookfield Co.). Furthermore, thixotropic index TI1 was measured according to the above-described formula (II).

(2) When the viscosity at 25° C. is in the range of not less than 20 Pa·s and less than 200 Pa·s, the viscosity was measured at 50 rpm using a rotary viscometer HBDV-1 (spindle SC4-14) (manufactured by Brookfield Co.). Furthermore, thixotropic index TI2 was measured according to the above-described formula (III1).

(3) When the viscosity at 25° C. is in the range of 200 Pa·s or more and 1,000 Pa·s or less, the viscosity was measured at 10 rpm using a rotary viscometer HBDV-1 (spindle SC4-14) (manufactured by Brookfield Co.). Furthermore, thixotropic index TI3 was measured according to the above-described formula (IV).

Types of syringes used in Examples and Comparative Examples are as illustrated in (1) to (10) below. Furthermore, the material and capacity of the syringe as well as the material of the plunger are described in Table 2.

(1) Size: 5 cm³, material: polypropylene (PP), manufactured by Nordson EFD LLC., product name: Optimum (registered trademark). In Tables, the type of this syringe is described as S1.

(2) Size: 10 cm³, material: polypropylene (PP), manufactured by Nordson EFD LLC., product name: Optimum (registered trademark). In Tables, the type of this syringe is described as S2.

(3) Size: 10 cm³, material: polypropylene (PP), manufactured by Musashi Engineering, Inc., product name: PSY-10E. In Tables, the type of this syringe is described as S3.
(4) Size: 10 cm³, material: polypropylene (PP), manufactured by Iwashita Engineering, Inc., product name: PS105. In Tables, the type of this syringe is described as S4.
(5) Size: 10 cm³, material: polypropylene (PP), San-Ei Tech Ltd., product name: SH11LL-B. In Tables, the type of this syringe is described as S5.
(6) Size: 30 cm³, material: polypropylene (PP), manufactured by Nordson EFD LLC., product name: Optimum (registered trademark). In Tables, the type of this syringe is described as S6.
(7) Size: 55 cm³, material: polypropylene (PP), manufactured by Nordson EFD LLC., product name: Optimum (registered trademark). In Tables, the type of this syringe is described as S7.
(8) Size: 180 cm³ (6 ounce, 6 oz), material: polyethylene (PE), manufactured by Nordson EFD LLC., product name: Optimum (registered trademark). In Tables, the type of this syringe is described as S8.
(9) Size: 360 cm³ (12 ounce, 12 oz), material: polyethylene (PE), manufactured by Nordson EFD LLC., product name: Optimum (registered trademark). In Tables, the type of this syringe is described as S9.
(10) Size: 355 cm³ (12 oz), material: polypropylene (PP), manufactured by SEMCO Co., Ltd., product name SEMCO 120 ounce cartridge. In Tables, the type of this syringe is described as S10.

TABLE 2

|  | Syringe |  | Plunger |
|---|---|---|---|
| S1 | 5 cm³ | PP | PE |
| S2 | 10 cm³ | PP | PE |
| S3 | 10 cm³ | PP | PE |
| S4 | 10 cm³ | PP | PE |
| S5 | 10 cm³ | PP | PE |
| S6 | 30 cm³ | PP | PE |
| S7 | 55 cm³ | PP | PE |
| S8 | 180 cm³ (6 oz) | PE | PE |
| S9 | 360 cm³ (12 oz) | PE | PE |
| S10 | 355 cm³ (12 oz) | PP | PE |

Example 1

The resin composition Epo1 indicated in Table 1 was mixed and dispersed using a triple roll mill. Thereafter, this resin composition was defoamed at 50 to 150 Pa for the time indicated in Table 3, using a hard mixer (manufactured by Nippon Sosey Kogyo Corporation, trade name or Model No. UVR-10L). Thereafter, the resin composition filling a cylinder by pressurized filling at a pressure of 0.3 MPa was centrifuged at 25° C., a rotation of 100 rpm, and a revolution of 1000 rpm for the time indicated in Table 3, using a centrifuge (manufactured by Nippon Sosey Kogyo Corporation, trade name UFO-15). Accordingly, a resin composition containing small voids was produced. A plunger 3 was inserted into a syringe 1 so as to contact a resin composition 2 filling the syringe 1. Accordingly, a syringe filled with a resin composition was produced. To a diameter-reduced opening 11 on one end of the syringe 1, a tip cap 21 was fitted. Furthermore, to an opening 12 on the other end of the syringe opposite the diameter-reduced opening 11, a head cap 22 was fitted. After filled with the resin composition and before refrigerated, the maximum diameter of the voids in the resin composition filling the syringe and the ratio of the volume of the voids relative to the volume of the resin composition filling the syringe were measured by a method described below. The measurement results are indicated in Table 3.

The syringe filled with the resin composition of Example 1 was refrigerated at −40° C. for 8 hours. The syringe filled with the resin composition of Example 1 after refrigerated was left to stand at room temperature (25° C.) for 1 hour. After left to stand, presence or absence of peeling of the resin composition from the syringe was checked by a method described below. Also, after left to stand, presence or absence of discharge break of the resin composition discharged from the syringe was checked by a method described below.

Example 2

A syringe filled with a resin composition was produced by the same method as Example 1, except that a syringe having a different capacity was used, and the filling amount of the resin composition was changed. The syringe filled with the resin composition was refrigerated at −40° C. for 8 hours.

Examples 3 to 10

A syringe filled with a resin composition was produced by the same method as Example 2, except that a time for defoaming by a hard mixer and a time for centrifugation were as indicated in Table 3, the amount of the resin composition to fill the syringe was as indicated in Table 3, and the storage temperature was as indicated in Table 3.

Examples 11 to 19

A syringe filled with a resin composition was produced by the same method as Example 2, except that the resin composition indicated in Table 4 was used in each Example. The syringe filled with the resin composition was refrigerated at −40° C. for 8 hours.

Example 20

A syringe filled with a resin composition was produced by the same method as Example 1, except that a resin composition containing acrylic resin was used as a resin composition before the syringe is filled. The syringe filled with the resin composition was refrigerated at −40° C. for 8 hours.

Examples 21 to 28

A syringe filled with a resin composition was produced by the same method as Example 1, except that, as indicated in Table 5, the capacity and type of the syringe were changed, and the amount of the resin composition to fill the syringe was changed. The syringe filled with the resin composition was refrigerated at −40° C. for 8 hours.

Comparative Example 1

The resin indicated in Table 6 was mixed and dispersed using a triple roll mill. Thereafter, this resin was defoamed at 96 Pa for 30 minutes, using a hard mixer (manufactured by Nippon Sosey Kogyo Corporation, trade name or Model No. UVR-10L). Thereafter, this resin was centrifuged at 25° C., a rotation of 100 rpm, and a revolution of 1000 rpm for the time indicated in Table 6, using a centrifuge (manufactured by Nippon Sosey Kogyo Corporation, trade name UFO-15). Accordingly, a resin composition was produced. This resin composition in the amount indicated in Table 6 filled a syringe having the material and capacity indicated in Table 6 at a pressure of 0.3 MPa by pressurized filling. As illustrated in FIG. 1, a plunger 3 was inserted into a syringe 1 so as to contact a resin composition 2 filling the syringe 1. Accordingly, a syringe filled with a resin composition was produced. To a diameter-reduced opening 11 on one end of the syringe 1, a tip cap 21 was fitted. Furthermore, to an opening 12 on the other end of the syringe 1 opposite the diameter-reduced opening, a head cap 22 was fitted. After filled with the resin composition and before refrigerated, the maximum diameter of the voids in the resin composition filling the syringe and the ratio of the volume of the voids relative to the volume of the resin composition filling the syringe were measured by a method described below. The measurement results are indicated in Table 6.

The syringe filled with the resin composition of Comparative Example 1 was refrigerated at −40° C. for 8 hours. The syringe filled with the resin composition of Comparative Example 1 after refrigerated was left to stand at room temperature (25° C.) for 1 hour. After left to stand, presence or absence of peeling of the resin composition from the syringe was checked by a method described below. Also, after left to stand, presence or absence of discharge break of the resin composition discharged from the syringe was checked by a method described below.

Comparative Example 2

A syringe filled with a resin composition was produced by the same method as Comparative Example 1, except that a time for defoaming by a hard mixer and a time for centrifugation were as indicated in Table 6, the amount of the resin composition to fill the syringe was as indicated in Table 6, and the storage temperature was as indicated in Table 6.

Comparative Examples 3 to 6

A syringe filled with a resin composition was produced by the same method as Comparative Example 1, except that the resin composition indicated in Table 6 was used in each Comparative Example. The syringe filled with the resin composition was refrigerated at −40° C. for 8 hours.

Comparative Example 7

The resin indicated in Table 6 was mixed and dispersed using a triple roll mill. Thereafter, this resin was defoamed at 50 to 150 Pa for the time indicated in Table 6, using a hard mixer (manufactured by Nippon Sosey Kogyo Corporation, trade name or Model No. UVR-10L). Accordingly, there was produced a resin composition in which all voids in resin were removed. Except that this resin composition was used, a syringe filled with a resin composition was produced by the same method as Comparative Example 1. The syringe filled with the resin composition was refrigerated at −40° C. for 8 hours.

Comparative Example 8

The resin indicated in Table 6 was mixed and dispersed using a triple roll mill. Thereafter, this resin was defoamed at 50 to 150 Pa for the time indicated in Table 6, using a hard mixer (manufactured by Nippon Sosey Kogyo Corporation, trade name or Model No. UVR-10L). Accordingly, there was produced a resin composition containing voids having the maximum diameter indicated in Table 6. Except that this resin composition was used, a syringe filled with a resin composition was produced by the same method as Comparative Example 1. The syringe filled with the resin composition was refrigerated at −40° C. for 8 hours.

Volume Ratio of Voids

Using an X-ray industrial computer tomograph (manufactured by RF Co., Ltd., trade name: NAOMi-CT), the inside of the syringe was scanned with an imaging resolution of 0.068 mm under the conditions of tube voltage: 80 kV and tube current: 3 mA. When the cross section of the syringe is larger than the imaging area of the industrial X-ray CT device, one cross section was scanned multiple times in parts. Accordingly, the entirety of the cross section was scanned. From the image (scanned image) obtained by a scan, the diameters of the voids contained in the resin composition filling the syringe were measured through visual inspection. From the measured diameters, the volume of each void was calculated. The summed amount of the volumes of the voids contained in the resin composition filling the syringe was divided by the volume of the resin composition filling the syringe. Accordingly, the volume ratio of the voids was calculated. Specifically, the volume ratio of the voids was calculated according to the above-described formula (I).

Maximum diameter (μm) and average diameter (μm) of voids

Based on the scanned image measured (obtained) through the industrial X-ray CT device used for the measurement of the volume ratio of the voids, the maximum diameter of the voids contained in the resin composition filling the syringe was measured. The maximum diameter of the voids means, for example, the largest linear distance among linear distances of the maximum lengths of the voids observed on the scanned image obtained through the above-described device. For all the voids in the syringe on the scanned image, the linear distance of the maximum length was measured. The linear distance of the measured largest maximum length was adopted as the maximum diameter. Also, the adopted average diameter of the voids is a value obtained by dividing the summed value of the linear distances of the maximum lengths of the voids, obtained through the measurement of the linear distances of the maximum lengths of all the voids in the syringe on the scanned image, by the number of voids.

Presence or Absence of Peeling of Resin Composition from Syringe

After refrigerated, presence or absence of peeling of the resin composition from the inner wall of the syringe filled with the resin composition according to each of Examples and Comparative Examples was checked. The syringe filled with the resin composition according to each of Examples and Comparative Examples after refrigerated was left to stand at room temperature (25° C.) for 1 hour. After left to stand, presence or absence of peeling of the resin composition from the inner wall of the syringe was checked through visual inspection. In Tables, "None" is described when peeling was not observed, and "Peeling" is described when peeling was observed.

Presence or Absence of Discharge Break

Figure 2:
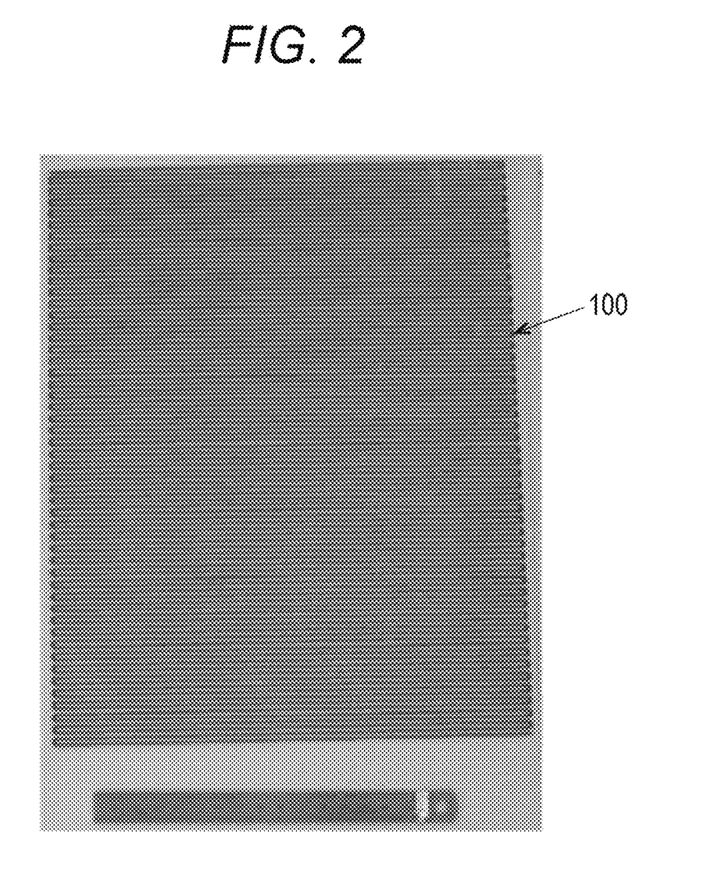
FIG. 2 is a photograph illustrating a resin composition continuously discharged from a syringe filled with a resin composition of Example 1.
Figure 3:
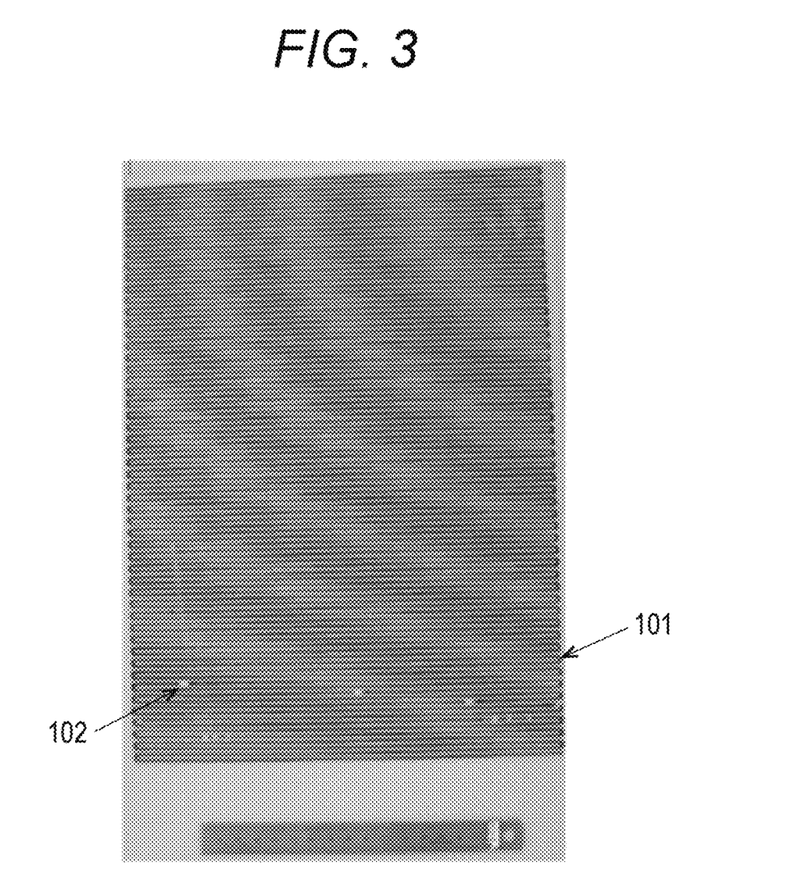
FIG. 3 is a photograph illustrating a resin composition intermittently discharged from a syringe filled with a resin composition, that is, an occurrence of discharge break, of Comparative Example 1.

The resin composition filling the syringe was continuously discharged at 25° C. and a rate of 1 cm/secg/sec until all the resin composition in the syringe was discharged. At this time, presence or absence of discharge break was checked. In Tables, "None" is described when no discharge break occurred, and the resin composition could be continuously discharged. "Break" is described when discharge break occurred, and a space was formed. FIG. 2 is a photograph illustrating an appearance of the resin composition discharged from the syringe filled with the resin composition according to Example 1. FIG. 3 is a photograph illustrating an appearance of the resin composition discharged from the syringe filled with the resin composition according to Comparative Example 1.

TABLE 3

|  |  | Example 1 | Example 2 | Example 3 | Example 4 | Example 5 |
|---|---|---|---|---|---|---|
| Syringe | Size (cm³) | 10 | 30 | 30 | 30 | 30 |
|  | Material | PP | PP | PP | PP | PP |
|  | Type | S2 | S6 | S6 | S6 | S6 |
| Plunger | Material | PE | PE | PE | PE | PE |
| Resin composition | Filling amount (cm³) | 7 | 20 | 20 | 20 | 20 |
|  | Viscosity (Pa·S) | 15 | 15 | 15 | 15 | 15 |
|  | TI value | 1.0 | 1.0 | 1.0 | 1.0 | 1.0 |
|  | Type of resin | Epo1 | Epo1 | Epo1 | Epo1 | Epo1 |
| Production conditions | Defoaming time (min) | 60 | 60 | 60 | 15 | 30 |
|  | Centrifugation time (min) | 5 | 10 | 10 | 1 | 5 |
| Voids | Volume ratio (ppm by volume) | 287.0 | 15.7 | 8.4 | 194.0 | 502.0 |
|  | Maximum diameter (μm) | 302 | 501 | 254 | 2121 | 694 |
|  | Average diameter (μm) | 274 | 480 | 238 | 325 | 280 |
| Storage conditions | Temperature (° C.) | −40 | −40 | −40 | −40 | −40 |
|  | Peeling | None | None | None | None | None |
|  | Discharge break | None | None | None | None | None |

|  |  | Example 6 | Example 7 | Example 8 | Example 9 | Example 10 |
|---|---|---|---|---|---|---|
| Syringe | Size (cm³) | 30 | 30 | 30 | 30 | 30 |
|  | Material | PP | PP | PP | PP | PP |
|  | Type | S6 | S6 | S6 | S6 | S6 |
| Plunger | Material | PE | PE | PE | PE | PE |
| Resin composition | Filling amount (cm³) | 20 | 10 | 28 | 20 | 20 |
|  | Viscosity (Pa·S) | 15 | 15 | 15 | 15 | 15 |
|  | TI value | 1.0 | 1.0 | 1.0 | 1.0 | 1.0 |
|  | Type of resin | Epo1 | Epo1 | Epo1 | Epo1 | Epo1 |
| Production conditions | Defoaming time (min) | 60 | 60 | 60 | 60 | 60 |
|  | Centrifugation time (min) | 10 | 10 | 10 | 10 | 10 |
| Voids | Volume ratio (ppm by volume) | 1.0 | 12.6 | 5.6 | 9.1 | 11.4 |
|  | Maximum diameter (μm) | 279 | 277 | 298 | 331 | 350 |
|  | Average diameter (μm) | 268 | 251 | 278 | 288 | 292 |
| Storage conditions | Temperature (° C.) | −40 | −40 | −40 | −20 | −60 |
|  | Peeling | None | None | None | None | None |
|  | Discharge break | None | None | None | None | None |

As indicated in Table 3, in the syringe filled with the resin composition according to each of Examples 1 to 10, the volume shrinkage of the resin composition when frozen could be suppressed by the voids contained in the resin composition, as long as the volume ratio of the voids contained in the resin composition was in the range of 1.0 ppm by volume to 520 ppm by volume, and the voids had a maximum diameter of 2,500 μm or less, even when the size of the syringe, the filling amount of the resin composition filling the syringe, and the storage temperature changed. This could eliminate peeling of the resin composition from the inner wall of the syringe. In the syringe filled with the resin composition according to each of Examples 1 to 10, air, which forms large voids and accordingly causes discharge break, could be prevented from being mixed in the resin composition. This could eliminate discharge break.

TABLE 4

|  |  | Example 11 | Example 12 | Example 13 | Example 14 | Example 15 |
|---|---|---|---|---|---|---|
| Syringe | Size (cm³) | 30 | 30 | 30 | 30 | 30 |
|  | Material | PP | PP | PP | PP | PP |
|  | Type | S6 | S6 | S6 | S6 | S6 |
| Plunger | Material | PE | PE | PE | PE | PE |
| Resin composition | Filling amount (cm³) | 20 | 20 | 20 | 20 | 20 |
|  | Viscosity (Pa·S) | 5 | 10 | 10 | 60 | 60 |
|  | TI value | 1.0 | 0.9 | 0.9 | 0.9 | 0.9 |
|  | Type of resin | Epo2 | Epo3 | Epo3 | Epo4 | Epo4 |
| Production conditions | Defoaming time (min) | 60 | 60 | 60 | 60 | 60 |
|  | Centrifugation time (min) | 10 | 10 | 5 | 10 | 5 |
| Voids | Volume ratio (ppm by volume) | 10.3 | 1.2 | 490.0 | 1.3 | 497.0 |
|  | Maximum diameter (μm) | 387 | 269 | 275 | 310 | 323 |
|  | Average diameter (μm) | 302 | 251 | 268 | 300 | 297 |
| Storage conditions | Temperature (° C.) | −40 | −40 | −40 | −40 | −40 |
|  | Peeling | None | None | None | None | None |
|  | Discharge break | None | None | None | None | None |

|  |  | Example 16 | Example 17 | Example 18 | Example 19 | Example 20 |
|---|---|---|---|---|---|---|
| Syringe | Size (cm³) | 30 | 30 | 30 | 30 | 30 |
|  | Material | PP | PP | PP | PP | PP |
|  | Type | S6 | S6 | S6 | S6 | S6 |

TABLE 4-continued

| | | | | | | |
|---|---|---|---|---|---|---|
| Plunger | Material | PE | PE | PE | PE | PE |
| Resin composition | Filling amount (cm³) | 20 | 10 | 28 | 20 | 20 |
| | Viscosity (Pa·S) | 400 | 400 | 623 | 623 | 15 |
| | TI value | 1.5 | 1.5 | 3.1 | 3.1 | 1.0 |
| | Type of resin | Epo5 | Epo5 | Epo6 | Epo6 | Acr 1 |
| Production conditions | Defoaming time (min) | 60 | 60 | 60 | 60 | 60 |
| | Centrifugation time (min) | 10 | 5 | 10 | 5 | 10 |
| Voids | Volume ratio (ppm by volume) | 2.5 | 476.0 | 2.1 | 479.0 | 156.0 |
| | Maximum diameter (μm) | 285 | 297 | 299 | 301 | 360 |
| | Average diameter (μm) | 261 | 259 | 286 | 279 | 261 |
| Storage conditions | Temperature (° C.) | −40 | −40 | −40 | −40 | −40 |
| | Peeling | None | None | None | None | None |
| | Discharge break | None | None | None | None | None |

As indicated in Table 4, in the syringe filled with the resin composition according to each of Examples 11 to 20, the volume shrinkage of the resin composition when frozen could be suppressed by the voids contained in the resin composition, as long as the viscosity at 25° C. of the resin composition was in the range of 2.5 Pa·s to 650 Pa·s, or the TI values of TI1 to TI13 were in the range of 0.8 to 3.5, the volume ratio of the voids contained in the resin composition was in the range of 1.0 ppm by volume to 520 ppm by volume, and the voids had a maximum diameter of 2,500 μm or less, even when the type of the resin contained in the resin composition changed. This could eliminate peeling of the resin composition from the inner wall of the syringe. In the syringe filled with the resin composition according to each of Examples 11 to 20, air, which forms large voids and accordingly causes discharge break, could be prevented from being mixed in the resin composition. This could eliminate discharge break.

TABLE 5

| | | Example 21 | Example 22 | Example 23 | Example 24 |
|---|---|---|---|---|---|
| Syringe | Size (cm³) | 5 | 55 | 180 | 360 |
| | Material | PP | PP | PE | PE |
| | Type | S1 | S7 | S8 | S9 |
| Plunger | Material | PE | PE | PE | PE |
| Resin composition | Filling amount (cm³) | 5 | 50 | 160 | 300 |
| | Viscosity (Pa·S) | 15 | 15 | 15 | 15 |
| | TI value | 1.0 | 1.0 | 1.0 | 1.0 |
| | Type of resin | Epo 1 | Epo1 | Epo1 | Epo1 |
| Production conditions | Defoaming time (min) | 60 | 60 | 45 | 60 |
| | Centrifugation time (min) | 5 | 10 | 1 | 5 |
| Voids | Volume ratio (ppm by volume) | 42.4 | 4.3 | 487.0 | 351.0 |
| | Maximum diameter (μm) | 425 | 525 | 870 | 512 |
| | Average diameter (μm) | 301 | 297 | 314 | 321 |
| Storage conditions | Temperature (° C.) | −40 | −40 | −40 | −40 |
| | Peeling | None | None | None | None |
| | Discharge break | None | None | None | None |

| | | Example 25 | Example 26 | Example 27 | Example 28 |
|---|---|---|---|---|---|
| Syringe | Size (cm³) | 355 | 10 | 10 | 10 |
| | Material | PP | PP | PP | PP |
| | Type | S10 | S3 | S4 | S5 |
| Plunger | Material | PE | PE | PE | PE |
| Resin composition | Filling amount (cm³) | 300 | 10 | 10 | 10 |
| | Viscosity (Pa·S) | 15 | 15 | 15 | 15 |
| | TI value | 1.0 | 1.0 | 1.0 | 1.0 |
| | Type of resin | Epo1 | Epo1 | Epo1 | Epo1 |
| Production conditions | Defoaming time (min) | 60 | 60 | 60 | 60 |
| | Centrifugation time (min) | 5 | 10 | 10 | 10 |
| Voids | Volume ratio (ppm by volume) | 322.0 | 23.1 | 76.1 | 89.9 |
| | Maximum diameter (μm) | 419 | 330 | 351 | 363 |
| | Average diameter (μm) | 310 | 295 | 278 | 263 |
| Storage conditions | Temperature (° C.) | −40 | −40 | −40 | −40 |
| | Peeling | None | None | None | None |
| | Discharge break | None | None | None | None |

As indicated in Table 5, in the syringe filled with the resin composition according to each of Examples 21 to 28, the volume shrinkage of the resin composition when frozen could be suppressed by the voids contained in the resin composition, as long as the volume ratio of the voids contained in the resin composition was in the range of 1.0 ppm by volume to 520 ppm by volume, and the voids had a maximum diameter of 2,500 μm or less, even when the size or type of the syringe to be filled with the resin composition changed. This could eliminate peeling of the resin composition from the inner wall of the syringe. In the syringe filled with the resin composition according to each of Examples 21 to 28, air, which forms large voids and accordingly causes discharge break, could be prevented from being mixed in the resin composition. This could eliminate discharge break.

resin composition according to Comparative Example 1, the volume ratio of the voids contained in the resin composition exceeds 520 ppm by volume. Therefore, discharge break had occurred. Accordingly, the resin composition discharged

TABLE 6

| | | Comparative Example 1 | Comparative Example 2 | Comparative Example 3 | Comparative Example 4 |
|---|---|---|---|---|---|
| Syringe | Size (cm$^3$) | 30 | 30 | 30 | 30 |
| | Material | PP | PP | PP | PP |
| | Type | S6 | S6 | S6 | S6 |
| Plunger | Material | PE | PE | PE | PE |
| Resin composition | Filling amount (cm$^3$) | 20 | 20 | 20 | 20 |
| | Viscosity (Pa•S) | 15 | 15 | 60 | 60 |
| | TI value | 1.0 | 1.0 | 0.9 | 0.9 |
| | Type of resin | Epo1 | Epo1 | Epo4 | Epo4 |
| Production conditions | Defoaming time (min) | 30 | 60 | 30 | 60 |
| | Centrifugation time (min) | 1 | 20 | 1 | 20 |
| Voids | Volume ratio (ppm by volume) | 553.0 | 0.8 | 551.0 | 0.8 |
| | Maximum diameter (μm) | 325 | 288 | 341 | 259 |
| | Average diameter (μm) | 261 | 288 | 269 | 259 |
| Storage conditions | Temperature (° C.) | −40 | −40 | −40 | −40 |
| | Peeling | None | Peeling | None | Peeling |
| | Discharge break | Break | None | Break | None |

| | | Comparative Example 5 | Comparative Example 6 | Comparative Example 7 | Comparative Example 8 |
|---|---|---|---|---|---|
| Syringe | Size (cm$^3$) | 30 | 30 | 30 | 30 |
| | Material | PP | PP | PP | PP |
| | Type | S6 | S6 | S6 | S6 |
| Plunger | Material | PE | PE | PE | PE |
| Resin composition | Filling amount (cm$^3$) | 20 | 20 | 20 | 20 |
| | Viscosity (Pa•S) | 623 | 623 | 623 | 15 |
| | TI value | 3.1 | 3.1 | 3.1 | 1.0 |
| | Type of resin | Epo6 | Epo6 | Epo6 | Epo1 |
| Production conditions | Defoaming time (min) | 30 | 60 | 60 | 5 |
| | Centrifugation time (min) | 1 | 20 | 20 | 0 |
| Voids | Volume ratio (ppm by volume) | 528.0 | 0.9 | 0.0 | 327.0 |
| | Maximum diameter (μm) | 257 | 310 | — | 2544 |
| | Average diameter (μm) | 241 | 278 | — | 271 |
| Storage conditions | Temperature (° C.) | −40 | −40 | −40 | −40 |
| | Peeling | None | Peeling | Peeling | None |
| | Discharge break | Break | None | None | Break |

As indicated in Table 6, in the syringe filled with the resin composition according to each of Comparative Examples 1, 3, and 5, the volume ratio of the voids contained in the resin composition exceeds 520 ppm by volume. Also, voids having a large volume are mixed in the resin composition. As a result, discharge break occurred. Also, in the syringe filled with the resin composition according to Comparative Example 8, the maximum diameter of the voids contained in the resin composition exceeds 2,500 μm. Then, discharge break occurred. In the syringe filled with the resin composition according to each of Comparative Examples 2, 4, and 6, the volume ratio of the voids contained in the resin composition is less than 1.0 ppm by volume. That is, the amount of the voids contained in the resin composition was excessively small. Therefore, the volume change of the resin composition when frozen is unlikely to be suppressed. As a result, the resin composition peeled from the inner wall of the syringe.

As illustrated in FIG. 2, in the syringe filled with the resin composition according to Example 1, discharge break did not occur. That is, the resin composition discharged from the syringe had drawn a continuous trace. FIG. 2 illustrates a continuous trace 100 discharged from the syringe filled with the resin composition according to Example. On the other hand, as illustrated in FIG. 3, in the syringe filled with the from the syringe had drawn an intermittently broken trace. FIG. 3 illustrates a broken trace 101 discharged from the syringe filled with the resin composition according to Comparative Example 1. In FIG. 3, reference sign 102 illustrates discharge break.

INDUSTRIAL APPLICABILITY

The syringe filled with the resin composition according to an embodiment of the present disclosure can be suitably used as a syringe filled with a viscous material. Examples of the viscous material include sealants for mechanical components or electronic components, adhesives, pastes for forming electrical and electronic circuits, and solders for mounting electronic components.

DESCRIPTION OF REFERENCE SIGNS

1: syringe, 2: resin composition, 3: plunger, 4: voids (spaces), 11: diameter-reduced opening, 12: opening, 13: flange, 21: tip cap, 22: head cap, 100: continuous trace, 101: broken trace, 102: discharge break

The invention claimed is:

1. A syringe filled with a resin composition, comprising:
   a syringe;
   a resin composition filling the syringe; and
   a plunger, wherein
   the resin composition contains voids,
   a ratio of a volume of the voids relative to a volume of the resin composition is 1.0 ppm by volume to 520 ppm by volume, and
   the voids have a maximum diameter of 2,500 μm or less.

2. The syringe filled with the resin composition according to claim 1,
   wherein the voids have an average diameter of 200 μm to 400 μm or less.

3. The syringe filled with the resin composition according to claim 1,
   wherein the resin composition includes at least one resin selected from epoxy resin and acrylic resin.

4. The syringe filled with the resin composition according to claim 1,
   wherein the resin composition has a viscosity of 2.5 Pa·s to 650 Pa·s, when a viscosity of less than 200 Pa·s is measured at a rotational speed of 50 rpm, and a viscosity of 200 Pa·s or more is measured at a rotational speed of 10 rpm, at 25° C. using a rotary viscometer.

5. The syringe filled with the resin composition according to claim 1,
   wherein thixotropic indices TI1 to TI3 measured under any of conditions (1) to (3) below, in the resin composition, are 0.8 to 3.5:

(1) Thixotropic index TI1 that is a ratio between a viscosity at 5 rpm and a viscosity at 50 rpm, when a viscosity at 50 rpm measured at 25° C. using a rotary viscometer is in a range of not less than 2.5 Pa·s and less than 20 Pa·s,
   (2) Thixotropic index TI2 that is a ratio between a viscosity at 5 rpm and a viscosity at 50 rpmn, when a viscosity at 50 rpm measured at 25° C. using a rotary viscometer is in a range of not less than 20 Pa·s and less than 200 Pa·s, and
   (3) Thixotropic index TI3 that is a ratio between a viscosity at 1 rpm and a viscosity at 10 rpm, when a viscosity at 10 rpm measured at 25° C. using a rotary viscometer is in a range of 200 Pa·s or more and 1,000 Pa·s or less.

6. The syringe filled with the resin composition according to claim 1,
   wherein the syringe is made from polypropylene or polyethylene.

7. The syringe filled with the resin composition according to claim 1,
   wherein the syringe has a capacity of 1 cm$^3$ to 600 cm$^3$.

8. A storage method of a syringe filled with a resin composition, comprising
   storing the syringe filled with the resin composition according to claim 1 at a temperature of −80° C. to 0° C.

* * * * *